Sept. 20, 1932.  E. R. FUREY ET AL  1,878,629
SCORE CARD
Filed Oct. 12, 1931   2 Sheets-Sheet 2
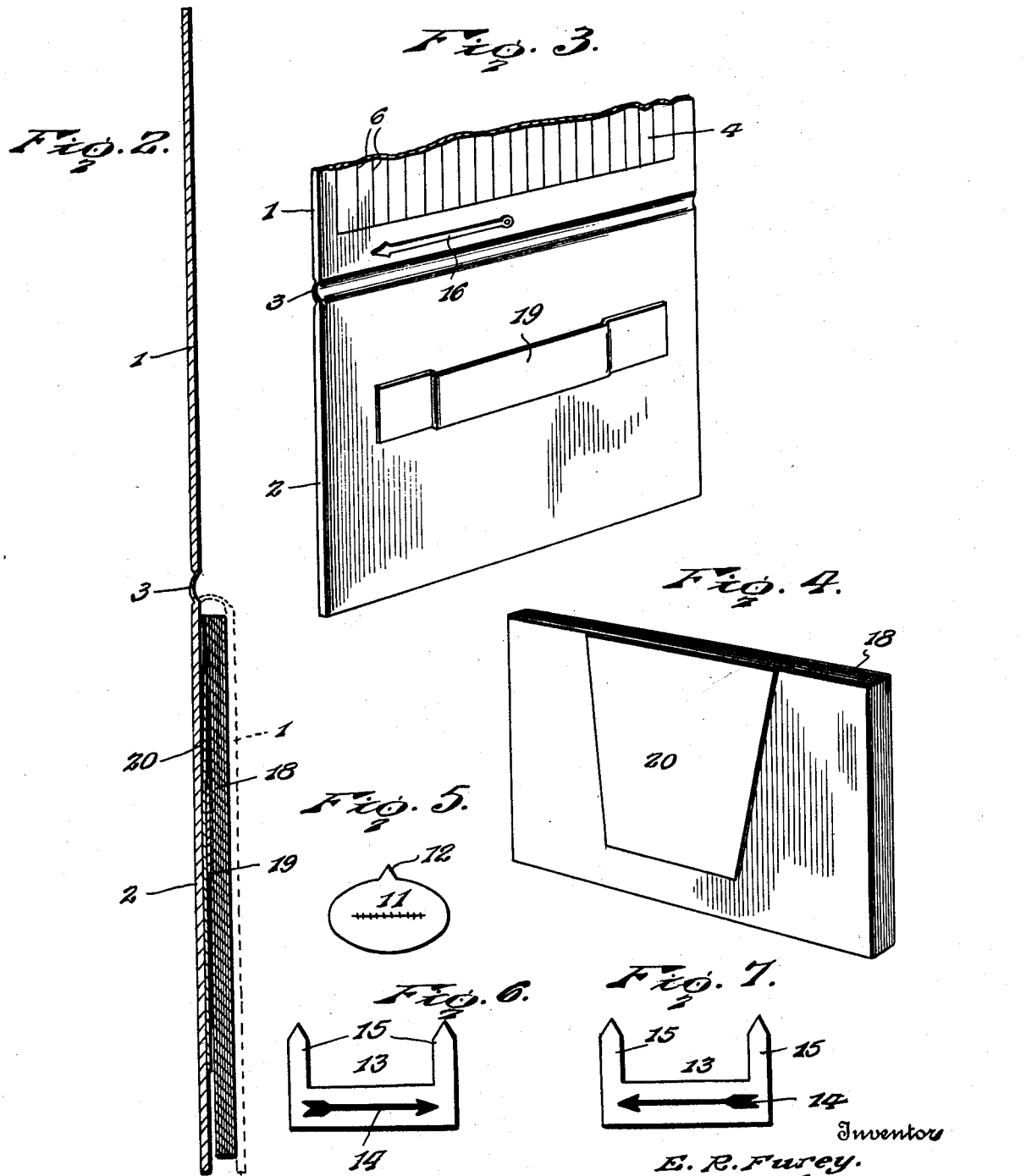
Inventors
E. R. Furey.
E. S. Anderson.
By Lacey & Lacey, Attorneys Patented Sept. 20, 1932

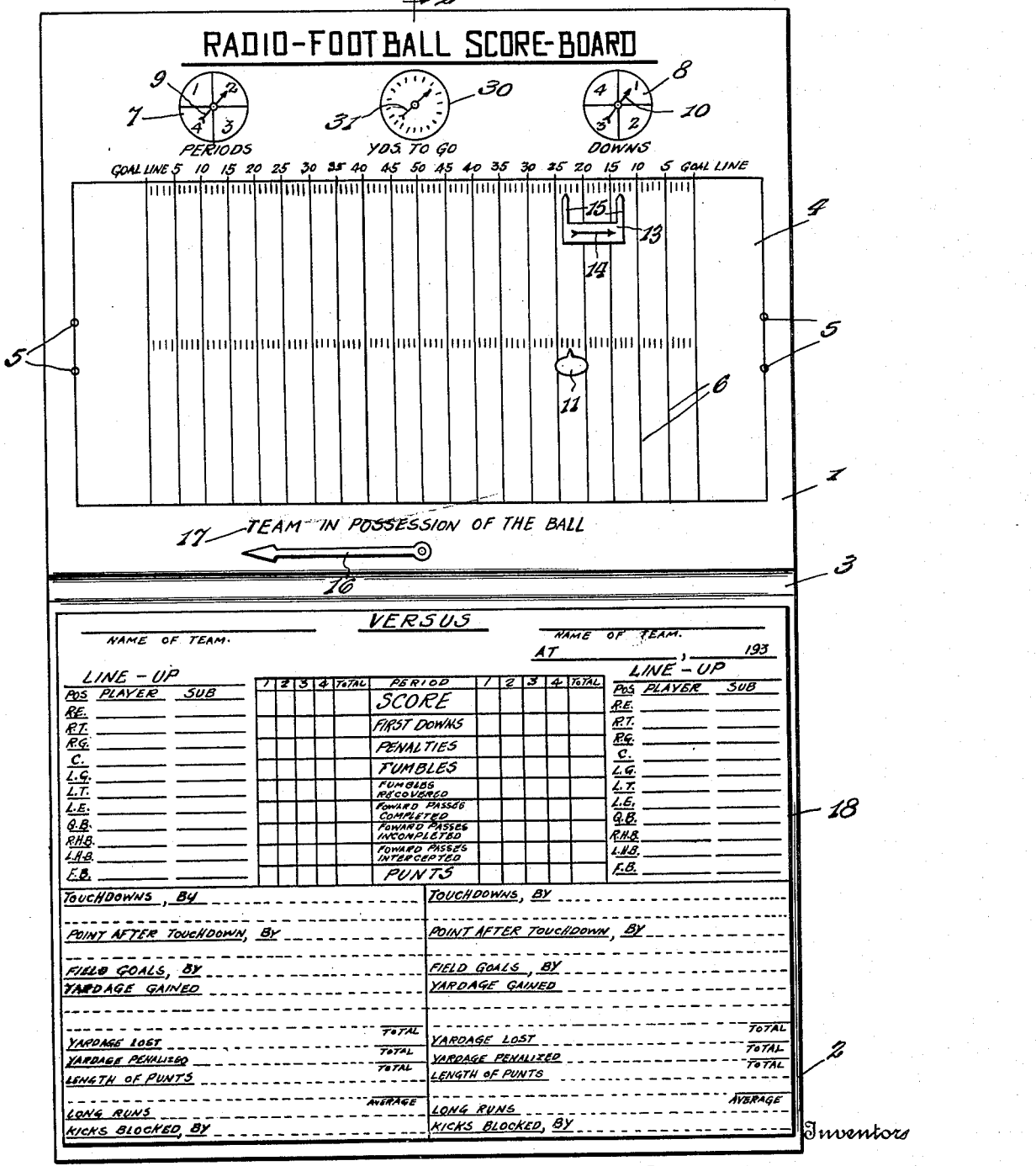

1,878,629

UNITED STATES PATENT OFFICE

EDWARD R. FUREY, OF NEW ROCHELLE, NEW YORK, AND EARLE S. ANDERSON, OF BOSTON, MASSACHUSETTS

SCORE CARD

Application filed October 12, 1931. Serial No. 568,462.

This invention has for its object the provision of means whereby a person listening in to a broadcast description of a foot ball game may be enabled to visualize the game as the plays are described. Another object of the invention is to provide a very inexpensive and simple device by the use of which all of the data pertaining to a game may be recorded as the plays are described and the exact position of the players and the ball upon the field may be noted at any time during the progress of the game. The stated objects are attained in the use of such a device as is illustrated in the accompanying drawings and the invention resides in certain novel features which will be first fully described and then more fully defined in the appended claims.

In the drawings,

Figure 1 is a plan view of a score card embodying my invention,

Fig. 2 is a section on the line 2—2 of Fig. 1,

Fig. 3 is a detail perspective view of a portion of the score board with the writing pad removed, Fig. 4 is a detail perspective view showing a rear view of the writing pad, Fig. 5 is a detail plan view of a marker representing the ball, Figs. 6 and 7 are detail plan views showing opposite sides of a marker employed to indicate the position of the play.

The score card comprises a board having two members 1 and 2 connected by a flexible strip 3 which serves as a hinge and permits the board to be folded into compact form when it is not in use. For convenience, the members 1 and 2 will be referred to as the upper and lower members, respectively, inasmuch as those terms denote the relative positions of these parts in the drawings. The upper member 1 has printed, or otherwise displayed, upon its face a diagram 4 which simulates a foot ball field having goal posts 5 indicated thereon at the opposite ends of the field and having distance lines 6 extending transversely of the field in the same relation as the lines are located upon a foot ball playing field, said lines being numbered progressively from the ends of the field to the center thereof to indicate the distance, in yards, of any particular line from the nearer goal, and the end lines are each marked "Goal line". Above the playing field are displayed circles or dials 7, 8 and 30 at the centers of which are pivoted markers 9, 10 and 31, respectively, which, preferably, will be in the form of arrows, as shown. Near the dial or circle 8 the word "Down" appears upon the card and adjacent the dial 9 the legend "Periods" appears. The dial 7 is inscribed with legends indicating the first, second, third or fourth period and during the course of the play, the arrow or marker 9 is to be turned to point to the legend corresponding to the period of actual game. The dial 8 is, of course, suitably inscribed and the marker 10 is set to indicate the reported stage of the play. The dial 30 has a circular series of numbers thereon and the marker 31 will be set to indicate the number of yards the team in possession of the ball must carry the ball in order to retain possession. There is provided a marker 11 to represent the ball and this marker is to be placed at such point in the field as the reporter of the game describes as the location of the ball in actual play, the marker being provided with a marginal tooth or pointer 12 which is intended to be placed upon the distance line 6 indicating the exact point in the playing field where the last play occurred. The marker may be formed of any inexpensive material and will generally be formed of cardboard or some similar material although the exact material is of no moment, but in order to add realism to the report of the game, the marker will be preferably so printed as to resemble a foot ball.

There is also provided a marker 13 for indicating the direction in which the ball is being carried, and the distance through which it must be carried for the team in possession to keep it. This marker consists of a strip of cardboard, or other suitable material, having an arrow, indicated at 14, printed upon each side thereof, the two arrows being pointed in opposite directions so that either side of the marker may be turned uppermost according to the direction in which the ball is supposed to be traveling in the game. At the ends of this marker are points 15 which are spaced apart a distance equal to the distance between lines 6 on the playing field equivalent to 10 yards so that, by placing the points upon the proper lines 6, in the diagram 4, the exact location of the play being described may be indicated upon the score card. The names of the contesting teams will be written in the margin of the upper member 1 of the card, below the diagram 4, and an arrow or pointer 16 will be pivoted upon the card, below the diagram, to be set so as to point to the name of the team having the ball, and a suitable indicating legend may be displayed on the field, as shown at 17 in Fig. 1.

The lower member 2 of the board is intended to hold a writing pad 18, the several sheets of which will be printed with a blank form especially adapted to receive the detailed data of the plays, the names of the players, with their positions, as well as all the scores and penalties, as will be understood. The pad will be of a well known type in which the successive sheets may be easily removed after they have been used, and several sheets may be used, if necessary, to fully record the progress of the game. A supporting loop 19 is secured on the face of the lower member 2 of the board and on the back of the pad 18 is a tongue 20 which is adapted to pass through the loop whereby the pad will be retained upon the board, as will be readily understood upon reference to Fig. 2. From the foregoing description, taken in connection with the accompanying drawings, it will be seen that we have provided an exceedingly simple device whereby listeners in may accurately follow a game which is being described over the radio and will at all times be informed of the exact condition of the game in a realistic manner independent of the descriptive powers of the broadcaster. By providing sheets upon which the plays may be recorded, and the names of the players inscribed, a permanent record may be created for subsequent analytical study, if it should be desired. The device may be stored in compact form when not in use and the markers may be placed between the leaves of the writing pad and will be thereby kept from slipping from between the members of the folded board and lost.

Having thus described the invention, we claim:

1. Means for visualizing a game from a broadcast description thereof comprising a board having a playing field marked thereon, and markers of sheet material to be set on the illustration of the playing field, one of said markers representing a ball and the other of said markers representing the direction in which the ball is to be carried and the distance over which it is to be carried.

2. Means for visualizing a game which is being broadcast comprising a board having a playing field diagram marked thereon, a marker of sheet material indicating a ball to be placed upon the diagram, a marker of sheet material indicating the direction in which the ball is to be carried and the distance through which it is to be carried to be placed upon the diagram, a pointer pivoted upon the board adjacent the diagram to indicate the possessor of the ball, and indicators upon the board at the opposite side of the diagram for indicating the "down," "period" and "yards to go".

3. Means for visualizing a foot ball game which is being broadcast, said means comprising a board having a diagram of a foot ball field marked thereon, a marker of sheet material simulating a foot ball and having a marginal tooth to be placed upon the diagram with the tooth on a distance line of the diagram at a position corresponding to the position of the ball in the game, and a marker consisting of a strip of sheet material having relatively reversed direction indicators on its opposite faces and provided with lateral points on one edge to be set on distance lines of the diagram.

4. Means for visualizing a foot ball game which is being broadcast comprising a board having a diagram of a foot ball field marked thereon, a marker to be placed upon the diagram for simulating a foot ball, a second marker having a direction indicator thereon and having spaced points on one edge to be placed on the diagram with said points in alinement with distance lines on the diagram, a writing pad containing sheets to receive data concerning the game, a loop on the board, and a tongue on the back of the writing pad engageable in said loop.

In testimony whereof we affix our signatures.

EDWARD R. FUREY. [L. S.]
EARLE S. ANDERSON. [L. S.]